US009082601B2

(12) United States Patent
Green et al.

(10) Patent No.: US 9,082,601 B2
(45) Date of Patent: *Jul. 14, 2015

(54) TANDEM ION TRAPPING ARRANGEMENT

(71) Applicant: Micromass UK Limited, Wilmslow (GB)

(72) Inventors: Martin Raymond Green, Bowdon (GB); Jason Lee Wildgoose, Stockport (GB)

(73) Assignee: Micromass UK Limited, Wilmslow (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,402

(22) Filed: May 19, 2014

(65) Prior Publication Data

US 2014/0252223 A1 Sep. 11, 2014

Related U.S. Application Data

(63) Continuation of application No. 13/936,491, filed on Jul. 8, 2013, now Pat. No. 8,729,461, which is a continuation of application No. 12/676,154, filed as application No. PCT/GB2008/002981 on Sep. 3, 2008, now Pat. No. 8,481,921.

(60) Provisional application No. 60/971,933, filed on Sep. 13, 2007.

(30) Foreign Application Priority Data

Sep. 4, 2007 (GB) .................................. 0717146.5

(51) Int. Cl.
*B01D 59/44* (2006.01)
*H01J 49/00* (2006.01)
*H01J 49/06* (2006.01)
*H01J 49/26* (2006.01)
*H01J 49/42* (2006.01)
*H01J 49/02* (2006.01)

(52) U.S. Cl.
CPC ............... *H01J 49/06* (2013.01); *H01J 49/004* (2013.01); *H01J 49/0031* (2013.01); *H01J 49/025* (2013.01); *H01J 49/26* (2013.01); *H01J 49/427* (2013.01); *H01J 49/4265* (2013.01)

(58) Field of Classification Search
USPC ................................. 250/281–283, 286–292
See application file for complete search history.

(56) References Cited

U.S. PATENT DOCUMENTS

| | | | | |
|---|---|---|---|---|
| 5,420,425 | A | 5/1995 | Bier et al. | |
| 5,517,025 | A | 5/1996 | Wells et al. | |
| 6,177,668 | B1 | 1/2001 | Hager | |
| 6,483,109 | B1 * | 11/2002 | Reinhold et al. | 250/292 |
| 6,878,929 | B2 | 4/2005 | Green et al. | |
| 7,071,464 | B2 | 7/2006 | Reinhold | |
| 7,211,788 | B2 | 5/2007 | Marriott | |
| 7,507,953 | B2 * | 3/2009 | Makarov et al. | 250/287 |

(Continued)

*Primary Examiner* — David Porta
*Assistant Examiner* — Meenakshi Sahu
(74) *Attorney, Agent, or Firm* — Diederiks & Whitelaw, PLC

(57) ABSTRACT

A mass spectrometer is disclosed comprising a first storage ion trap arranged upstream of a high performance analytical ion trap. According to an embodiment, ions are simultaneously scanned from both the first and second ion trap. At any instant in time, the quantity of charge present within the second ion trap is limited or restricted so that the second ion trap does not suffer from space charge saturation effects and hence the performance of the second ion trap is not degraded.

20 Claims, 4 Drawing Sheets

(56) References Cited

U.S. PATENT DOCUMENTS

| | | | | |
|---|---|---|---|---|
| 8,481,921 | B2 * | 7/2013 | Green et al. | 250/281 |
| 2003/0071206 | A1 | 4/2003 | Belov et al. | |
| 2004/0245455 | A1 * | 12/2004 | Reinhold | 250/288 |
| 2005/0127290 | A1 | 6/2005 | Hashimoto et al. | |
| 2005/0269504 | A1 * | 12/2005 | Hashimoto et al. | 250/286 |
| 2007/0045533 | A1 | 3/2007 | Krutchinsky et al. | |
| 2007/0114376 | A1 | 5/2007 | Hager | |
| 2007/0181804 | A1 | 8/2007 | Hashimoto et al. | |
| 2011/0303838 | A1 | 12/2011 | Green et al. | |

* cited by examiner

TANDEM ION TRAPPING ARRANGEMENT

CROSS REFERENCE TO RELATED APPLICATIONS

This application is a continuation of U.S. patent application Ser. No. 13/936,491 filed Jul. 8, 2013 which is a continuation of U.S. patent application Ser. No. 12/676,154 filed May 4, 2010, which is the National Stage of International Application No. PCT/GB2008/002981, filed Sep. 3, 2008, which claims priority to and benefit of United Kingdom Patent Application No. 0717146.5, filed Sep. 4, 2007 and U.S. Provisional Patent Application Ser. No. 60/971,933, filed Sep. 13, 2007. The entire contents of these applications are incorporated herein by reference.

BACKGROUND OF THE INVENTION

The present invention relates to a mass spectrometer and a method of mass spectrometry. The preferred embodiment relates to a mass spectrometer comprising tandem ion traps.

Various ion trapping techniques are well known in the field of mass spectrometry. For example, commercial 3D or Paul ion traps are known which comprise a central ring electrode and two end-cap electrodes. Linear geometry or 2D linear ion traps (LIT) are also known which comprise a quadrupole rod set and two end electrodes for confining ions axially within the ion trap.

It is known to trap or confine ions within an ion trap by applying inhomogeneous fields modulated at radio frequencies to the electrodes comprising the ion trap. DC trapping potentials may also be applied to some of the electrodes in order to confine ions axially within the ion trap. It is known to mass selectively eject ions from ion traps in either a radial or axial direction using a variety of different techniques.

However, known commercial ion traps suffer from the problem of having a relatively limited dynamic range. The relatively limited dynamic range is due to the onset of space charge saturation effects which occur when relatively high density ion populations are stored simultaneously within the ion trap. Space charge saturation effects in analytical ion traps have the effect of causing a loss in analytical performance. In particular, mass resolution, mass measurement precision and precision of quantitation may be reduced. Furthermore, as mentioned above, space charge saturation effects reduce the dynamic range of mass spectra which can be produced using the ion trap.

It is therefore desired to provide an improved mass spectrometer and method of mass spectrometry.

SUMMARY OF THE INVENTION

According to an aspect of the present invention there is provided a mass spectrometer comprising:

a first mass selective ion trap comprising a first plurality of electrodes;

a second mass selective ion trap comprising a second plurality of electrodes, wherein the second mass selective ion trap is arranged downstream of the first mass selective ion trap;

wherein in a mode of operation a group of ions is arranged to be stored or trapped at an initial time T0 in or within the first ion trap;

the mass spectrometer further comprising:

a control system which is arranged and adapted:

(i) to cause the first ion trap to mass selectively eject at least some ions out of the first is ion trap during a first scan, wherein at least some of the ions which are mass selectively ejected from and/or which emerge from the first ion trap are subsequently received by and stored or trapped in or within the second ion trap; and (ii) to cause the second ion trap to mass selectively eject at least some ions out of the second ion trap during a second scan.

The term "mass selective ejection" and "to mass selectively eject" should be understood as covering embodiments wherein ions having specific masses or mass to charge ratios or masses or mass to charge ratios within a particular range are ejected from an ion trap or are otherwise caused to become unstable within an ion trap and hence are caused to emerge from the ion trap.

According to various embodiments, ions may be mass selectively or mass to charge ratio selectively ejected from the first ion trap and/or from the second ion trap by various techniques including mass selective instability, resonance ejection, parametric or nonlinear resonance excitation or by non-resonant ejection. Less preferred embodiments are contemplated wherein more than two ion traps may be provided, preferably in series. According to this less preferred embodiment, ions may also be ejected from the further ion traps by mass selective instability, resonance ejection, parametric or nonlinear resonance excitation or by non-resonant ejection.

According to an embodiment, ions may be mass selectively or mass to charge ratio selectively ejected from the first ion trap and/or from the second ion trap in an axial and/or radial direction or manner.

According to an embodiment, the control system may be arranged and adapted to adjust the frequency and/or amplitude of an AC or RF voltage applied to the first plurality of electrodes and/or to the second plurality of electrodes in order to eject ions from the first ion trap and/or the second ion trap by mass selective instability.

During the first scan and/or during the second or subsequent scans a mass selective instability parameter (such as the frequency and/or amplitude of an applied AC or RF voltage) may be varied, scanned, increased or decreased. The parameter may be varied, scanned, increased or decreased in a progressive, regular, non-regular, linear, non-linear, continuous or discontinuous manner.

According to an embodiment, the control system may be arranged and adapted to apply and/or superimpose an AC or RF supplementary waveform or voltage or tickle voltage to the first plurality of electrodes and/or to the second plurality of electrodes in order to eject ions from the first ion trap and/or from the second ion trap by resonance ejection.

During the first scan and/or during the second or subsequent scans a resonance ejection parameter (such as the frequency and/or amplitude of an applied AC or RF supplementary waveform or voltage or tickle voltage) may be varied, scanned, increased or decreased. The parameter may be varied, scanned, increased or decreased in a progressive, regular, non-regular, linear, non-linear, continuous or discontinuous manner.

According to an embodiment, the control system may be arranged and adapted to apply and/or superimpose a DC bias voltage to the first plurality of electrodes and/or to the second plurality of electrodes in order to eject ions from the first ion trap and/or from the second ion trap in a mass selective manner.

During the first scan and/or during the second or subsequent scans, a mass selective parameter (such as the amplitude of an applied DC bias voltage) may be varied, scanned, increased or decreased. The parameter may be varied, scanned, increased or decreased in a progressive, regular, non-regular, linear, non-linear, continuous or discontinuous manner.

According to an embodiment, the control system may be arranged and adapted to apply and/or superimpose a supplementary AC or RF voltage or potential to the first plurality of electrodes and/or to the second plurality of electrodes in order to excite parametrically or to nonlinearly excite at least some ions within the first ion trap and/or within the second ion trap. The supplementary AC or RF voltage or potential preferably has a frequency σ which is substantially different from the fundamental or resonance frequency w of ions which are desired to be excited parametrically. According to an embodiment, the supplementary AC or RF voltage or potential may have a frequency σ equal to >2ω, 2ω, >1.2ω, >1ω, <1ω, <0.8ω, 0.667ω, 0.5ω, 0.4ω, 0.33ω, 0.286ω, 0.25ω or <0.25ω wherein ω is the fundamental or resonance frequency of ions which are desired to be excited parametrically.

During the first scan and/or during the second or subsequent scans, a parametric excitation or nonlinear resonance parameter (such as the frequency and/or amplitude of a supplementary AC or RF voltage) may be varied, scanned, increased or decreased. The parameter may be varied, scanned, increased or decreased in a progressive, regular, non-regular, linear, non-linear, continuous or discontinuous manner.

According to an embodiment, the control system may be arranged and adapted to apply one or more AC and/or DC voltages to the first plurality of electrodes and/or to the second plurality of electrodes in order to eject ions from the first ion trap and/or from the second ion trap in a non-resonant manner.

During the first scan and/or during the second or subsequent scans, a non-resonance ejection parameter (such as the frequency and/or amplitude of an applied AC or RF voltage and/or an applied DC voltage) may be varied, scanned, increased or decreased. The parameter may be varied, scanned, increased or decreased in a progressive, regular, non-regular, linear, non-linear, continuous or discontinuous manner.

The mass spectrometer may be arranged and adapted to progressively increase, progressively decrease, progressively vary, scan, linearly increase, linearly decrease, increase in a stepped, progressive or other manner or decrease in a stepped, progressive or other manner the amplitude (or where appropriate the frequency) and/or frequency of a mass selective instability parameter, a resonance ejection parameter, a parametric or nonlinear resonance ejection parameter, a non-resonant ejection parameter, an AC or RF and/or a DC voltage preferably by $X_{scan}$ Volts. The parameter (amplitude and/or frequency) is preferably scanned over a time period $T_{scan}$.

Preferably, $X_{scan}$ is selected from the group consisting of (i) <50 V peak to peak; (ii) 50-100 V; (iii) 100-150 V; (iv) 150-200 V; (v) 200-250 V; (vi) 250-300 V; (vii) 300-350 V; (viii) 350-400 V; (ix) 400-450 V; (x) 450-500 V; (xi) 500-550 V; (xii) 550-600 V; (xiii) 600-650 V; (xiv) 650-700 V; (xv) 700-750 V; (xvi) 750-800 V; (xvii) 800-850 V; (xviii) 850-900 V; (xix) 900-950 V; (xx) 950-1000 V; and (xxi) >1000 V.

Preferably, $T_{scan}$ is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

At the initial time T0 and/or for a time period ΔT thereafter the second ion trap is preferably substantially empty of ions. The time period ΔT is preferably selected from the group consisting of: (i) <0.1 μs; (ii) 0.1-0.5 μs; (iii) 0.5-1 μs; (iv) 1-5 μs; (v) 5-10 μs; (vi) 10-50 μs; (vii) 50-100 μs; (viii) 100-500 μs; (ix) 500-1000 μs; (x) 1-5 ms; (xi) 5-10 ms; (xii) 10-50 ms; (xiii) 50-100 ms; (xiv) 100-500 ms; (xv) 500-1000 ms; and (xvi) >1 s.

The first ion trap and/or the second ion trap are preferably selected from the group consisting of:

(i) a 2D or linear quadrupole ion trap;

(ii) a 2D or linear quadrupole ion tap comprising a plurality of rod electrodes wherein an AC or RE voltage is applied to the plurality of rod electrodes in order to confine ions radially within the ion trap and wherein a DC and/or an AC or RF voltage is applied to one or more electrodes in order to confine ions in at least one axial direction within the ion trap;

(iii) a 3D quadrupole or Paul ion trap;

(iv) a 3D or Paul ion trap comprising a central ring electrode and two hyperbolic end-cap electrodes wherein an AC or RF voltage is applied to the central ring electrode and/or to the one or more of the end-cap electrodes in order to confine ions within the ion trap;

(v) a cylindrical ion trap;

(vi) a cylindrical ion trap comprising a cylindrical electrode and one or more planar end-cap electrodes;

(vii) a cubic ion trap;

(viii) a cubic ion trap comprising six planar electrodes;

(ix) a Penning ion trap;

(x) a Penning ion trap comprising a magnetic field for confining ions radially as ions follow a circular trajectory; and (xi) an electrostatic or orbitrap mass analyser The first ion trap and/or the second ion trap may according to an embodiment comprise a plurality of segmented rod electrodes or a plurality of electrodes having at least one aperture through which ions are transmitted in use. One or more transient DC voltages or potentials or one or more transient DC voltage or potential waveforms are preferably applied to the electrodes so that at least some ions are separated according to their mass to charge ratio.

The first ion trap and/or the second ion trap may according to an embodiment comprise:

an ion guide comprising a plurality of electrodes;

a device for applying an AC or RF voltage to at least some of the plurality of electrodes such that, in use, a plurality of axial time averaged or pseudo-potential barriers, corrugations or wells are created along at least a portion of the axial length of the ion guide; and a device for driving or urging ions along and/or through at least a portion of the axial length of the ion guide so that in a mode of operation ions having mass to charge ratios within a first range exit the ion guide Whilst ions having mass to charge ratios within a second different range are axially trapped or confined within the ion guide by the plurality of axial time averaged or pseudo-potential barriers, corrugations or wells.

The device for driving or urging ions comprises a device for applying one or more transient DC voltages or potentials or DC voltage or potential waveforms to at least 1%, 5%, 10%, 20%, 30%, 40%, 50%, 60%, 70%, 80%, 90%, 95% or 100% of the electrodes.

The first ion trap and/or the second ion trap may according to an embodiment comprise:

an ion guide or ion trap comprising one or more first electrodes;

one or more exit electrodes arranged downstream of the first electrodes; and control means arranged to trap ions in a mode of operation within the ion guide or ion trap and to perform a plurality of cycles of operation, wherein in each cycle of operation at least some ions are enabled to exit the ion guide or ion trap during a first time period $T_e$ and thereafter ions are substantially prevented from exiting the ion guide or ion trap for a second time period $T_c$.

The control means is preferably further arranged to substantially prevent ions from entering the ion guide or ion trap whilst the plurality of cycles of operation are being performed and to vary the length or width of the first time period $T_e$ in subsequent cycles of operation.

The first ion trap and/or the second ion trap may according to an embodiment comprise:

a first plurality of electrodes arranged in a first orientation; and a second plurality of electrodes arranged in a second different orientation.

A DC voltage is preferably applied to the first plurality of electrodes to confine ions in a first radial direction and an AC or RF voltage is preferably applied to the second plurality of electrodes to confine ions in a second different radial direction.

The first ion trap and/or the second ion trap may according to an embodiment comprise:

a first electrode set comprising a first plurality of electrodes;

a second electrode set comprising a second plurality of electrodes;

a first device arranged and adapted to apply one or more DC voltages to one or more of the first plurality of electrodes and/or to one or more of the second plurality electrodes so that:

(a) ions having a radial displacement within a first range experience a DC trapping field, a DC potential barrier or a barrier field which acts to confine at least some of the ions in at least one axial direction within the ion trap; and (b) ions having a radial displacement within a second different range experience either: (i) a substantially zero DC trapping field, no DC potential barrier or no barrier field so that at least some of the ions are not confined in the at least one axial direction within the ion trap; and/or (ii) a DC extraction field, an accelerating DC potential difference or an extraction field which acts to extract or accelerate at least some of the ions in the at least one axial direction and/or out of the ion trap; and a second device arranged and adapted to vary, increase, decrease or alter the radial displacement of at least some ions within the ion trap.

The first ion trap and/or the second ion trap may according to an embodiment comprise:

an ion guide comprising a plurality of electrodes;

a device for applying a first AC or RF voltage to at least some of the plurality of electrodes such that, in use, a plurality of first axial time averaged or pseudo-potential barriers, corrugations or wells having a first amplitude are created along at least a portion of the axial length of the ion guide;

a device for driving or urging ions along at least a portion of the axial length of the ion guide; and a device for applying a second AC or RF voltage to one or more of the plurality of electrodes such that, in use, one or more second axial time averaged or pseudo-potential barriers, corrugations or wells having a second amplitude are created along at least a portion of the axial length of the ion guide, wherein the second amplitude is different from the first amplitude.

According to the preferred embodiment, the first ion trap has or is operated to have a higher or greater ion storage or charge capacity than the second ion trap. In a mode of operation, the total charge and/or number of ions present within the second ion trap is preferably arranged to be substantially less than the total charge and/or number of ions present within the first ion trap.

At one or more instants in time when ions are being mass selectively ejected from the second ion trap the total charge and/or number of ions in or within the second ion trap is preferably arranged either:

(i) to be less than the total charge and/or number of ions in or within the first ion trap; and/or (ii) to be less than the total charge and/or number of ions which were stored or trapped at the initial time T0 in or within the first ion trap; and/or (iii) to be less than the total charge and/or number of ions which reside in both the first and second ion traps.

According to the preferred embodiment at one or more instants in time, the total charge and/or number of ions within the first ion trap and/or the second ion trap is selected from the group consisting of: (i) 0-1000; (ii) 1000-2000; (iii) 2000-3000; (iv) 3000-4000; (v) 4000-5000; (vi) 5000-10000; (vii) 10000-15000; (viii) 15000-20000; (ix) 20000-25000; (x) 25000-30000; (xi) 30000-35000; (xii) 35000-40000; (xiii) 40000-45000; (xiv) 45000-50000; and (xv) >50000.

In a mode of operation, the mass or mass to charge ratio resolution R2 of the second ion trap is preferably substantially higher or is arranged to be substantially higher than the mass or mass to charge ratio resolution R1 of the first ion trap. The ratio R2/R1 is preferably arranged to be selected from the group consisting of: (i) >1; (ii) 1-2; (iii) 2-3; (iv) 3-4; (v) 4-5; (vi) 5-6; (vii) 6-7; (viii) 7-8; (ix) 8-9; (x) 9-10; (xi) 10-15; (xii) 15-20; (xiii) 20-25; (xiv) 25-30; (xv) 30-35; (xvi) 35-40; (xvii) 40-45; (xviii) 45-50; and (xix) >50.

In the mode of operation, the first ion trap is preferably operated so that ions having a first mass to charge ratio are arranged to or may emerge from the first ion trap within a first time window and wherein ions having the same first mass to charge ratio are arranged to or may emerge from the second ion trap within a second subsequent time window. The first time window preferably has a first width and the second time window has a second width. The second width is preferably substantially narrower than the first width. The ratio of the first width to the second width is preferably selected from the group consisting of: (i) 1-2; (ii) 2-3; (iii) 3-4; (iv) 4-5; (v) 5-6; (vi) 6-7; (vii) 7-8; (viii) 8-9; (ix) 9-10; (x) 10-15; (xi) 15-20; (xii) 20-25; (xiii) 25-30; (xiv) 30-35; (xv) 35-40; (xvi) 40-45; (xvii) 45-50; and (xviii) >50.

In the mode of operation, the first ion trap is preferably operated so that ions having a first mass to charge ratio are arranged to or may emerge from the first ion trap at a first time $\mathbf{T1}\pm\Delta\mathbf{T1}$ and wherein ions having the same first mass to charge ratio are arranged to or may emerge from the second ion trap at a second subsequent time $\mathbf{T2}\pm\Delta\mathbf{T2}$. According to the preferred embodiment, $\Delta\mathbf{T2}<\Delta\mathbf{T1}$.

The ratio $\Delta\mathbf{T1}/\Delta\mathbf{T2}$ is preferably selected from the group consisting of: (i) 1-2; (ii) 2-3; (iii) 3-4; (iv) 4-5; (v) 5-6; (vi) 6-7; (vii) 7-8; (viii) 8-9; (ix) 9-10; (x) 10-15; (xi) 15-20; (xii) 20-25; (xiii) 25-30; (xiv) 30-35; (xv) 35-40; (xvi) 40-45; (xvii) 45-50; and (xviii) 50.

The first mass to charge ratio is preferably selected from the group consisting of: (i) 50; (ii) 100; (iii) 150; (iv) 200; (v) 250; (vi) 300; (vii) 350; (viii) 400; (ix) 450; (x) 500; (xi) 550; (xii) 600; (xiii) 650; (xiv) 700; (xv) 750; (xvi) 800; (xvii) 850; (xviii) 900; (xix) 950; (xx) 1000; (xxi) 1100; (xxii) 1200;

(xxiii) 1300; (xxiv) 1400; (x_xv) 1500; (xxvi) 1600; (xxvii) 1700; (xxviii) 1800; (xxix) 1900; and (xxx) 2000.

The first scan is preferably commenced at a time $T_1$start and is preferably completed at a subsequent time $T_1$end and wherein the second scan is commenced at a time $T_2$start and is preferably completed at a subsequent time $T_2$end, and wherein either:

(i) $T_2$end>$T_1$end>$T_2$start>$T_1$start; or (ii) $T_2$Lend>$T_2$start>$T_1$end>$T_1$start.

According to the preferred embodiment:

(a) the duration of the first scan $T_1$end-$T_1$start is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s; and/or (b) the duration of the second scan $T_2$end-$T_2$start is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s; and/or (c) the overall duration of the first scan and the second scan as measured from the start of the first scan to the end of the second scan $T_2$end-$T_1$start is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

The first ion trap and the second ion trap are preferably simultaneously scanned for at least 5%, 10%, 15%, 20%, 25%, 30%, 35%, 40%, 45%, 50%, 55%, 60%, 65%, 70%, 75%, 80%, 85%, 90% or 95% of either:

(i) the duration of the first scan $T_1$end-$T_1$start; and/or (ii) the duration of the second scan $T_2$end-$T_2$start; and/or (iii) the overall duration of the first scan and the second scan as measured from the start of the first scan to the end of the second scan $T_2$end-$T_1$start. The mass spectrometer preferably farther comprises a first AC or RF voltage supply for applying a first AC or RF voltage to at least some of the first plurality of electrodes, wherein either:

(a) the first AC or RF voltage has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; (xi) 500-550 V peak to peak; (xii) 550-600 V peak to peak; (xiii) 600-650 V peak to peak; (xiv) 650-700 V peak to peak; (xv) 700-750 V peak to peak; (xvi) 750-800 V peak to peak; (xvii) 800-850 V peak to peak; (xviii) 850-900 V peak to peak; (xix) 900-950 V peak to peak; (xx) 950-1000 V peak to peak; and (xxi) >1000 V peak to peak; and/or (b) the first AC or RF voltage has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz; and/or (c) the first AC or RF voltage supply is arranged to apply the first AC or RF voltage to at least 1%, 5%, 10%, 15%, 20%, 25%, 30%, 35%, 40%, 45%, 50%, 55%, 60%, 65%, 70%, 75%, 80%, 85%, 90%, 95% or 100% of the plurality of first electrodes and/or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or >50 of the first plurality of electrodes; and/or (d) the first AC or RF voltage supply is arranged to supply axially adjacent electrodes or axially adjacent groups of the first plurality of electrodes with opposite phases of the first AC or RF voltage.

The mass spectrometer preferably further comprises a first device arranged and adapted to progressively increase, progressively decrease, progressively vary, scan, linearly increase, linearly decrease, increase in a stepped, progressive or other manner or decrease in a stepped, progressive or other manner the amplitude of the first AC or RF voltage by $x_1$ Volts over a time period $t_1$.

Preferably, $x_1$ is selected from the group consisting of (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; (xi) 500-550 V peak to peak; (xii) 550-600 V peak to peak; (xiii) 600-650 V peak to peak; (xiv) 650-700 V peak to peak; (xv) 700-750 V peak to peak; (xvi) 750-800 V peak to peak; (xvii) 800-850 V peak to peak; (xviii) 850-900 V peak to peak; (xix) 900-950 V peak to peak; (xx) 950-1000 V peak to peak; and (xxi) >1000 V peak to peak.

Preferably, $t_1$ is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

According to the preferred embodiment, one or more first axial time averaged or pseudo-potential barriers, corrugations or wells are created, in use, along at least 1%, 5%, 10%, 20%, 30%, 40%, 50%, 60%, 70%, 80%, 90% or 95% of the axial length of the first ion trap.

The mass spectrometer preferably further comprises a second AC or RF voltage supply for applying a second AC or RF voltage to at least some of the second plurality of electrodes, wherein either:

(a) the second AC or RF voltage has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; (xi) 500-550 V peak to peak; (xii) 550-600 V peak to peak; (xiii) 600-650 V peak to peak; (xiv) 650-700 V peak to peak; (xv) 700-750 V peak to peak; (xvi) 750-800 V peak to peak; (xvii) 800-850 V peak to peak; (xviii) 850-900 V peak to peak; (xix) 900-950 V peak to peak; (xx) 950-1000 V peak to peak; and (xxi) >1000 V peak to peak; and/or (b) the second AC or RF voltage has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz; and/or (c) the second AC or RF voltage supply is arranged to apply the second AC or RF voltage to at least 1%, 5%, 10%, 15%, 20%, 25%, 30%, 35%, 40%, 45%, 50%, 55%, 60%, 65%, 70%, 75%, 80%, 85%, 90%, 95% or 100% of the plurality of second electrodes and/or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or >50 of the second plurality of electrodes; and/or (d) the second AC or RF voltage supply is arranged to supply axially adjacent electrodes or axially adjacent groups of the second plurality of electrodes with opposite phases of the second AC or RF voltage.

The mass spectrometer preferably further comprises a second device arranged and adapted to progressively increase, progressively decrease, progressively vary, scan, linearly increase, linearly decrease, increase in a stepped, progressive or other manner or decrease in a stepped, progressive or other manner the amplitude of the second AC or RF voltage by $x_2$ Volts over a time period $t_2$.

Preferably, $x_2$ is selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; (xi) 500-550 V peak to peak; (xii) 550-600 V peak to peak; (xiii) 600-650 V peak to peak; (xiv) 650-700 V peak to peak; (xv) 700-750 V peak to peak; (xvi) 750-800 V peak to peak; (xvii) 800-850 V peak to peak; (xviii) 850-900 V peak to peak; (xix) 900-950 V peak to peak; (xx) 950-1000 V peak to peak; and (xxi) >1000 V peak to peak.

Preferably, $t_2$ is selected from the group consisting of: (i) <1 ms; (ii) 1-10 ms; ii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

According to the preferred embodiment, one or more second axial time averaged or pseudo-potential barriers, corrugations or wells are created, in use, along at least 1%, 5%, 10%, 20%, 30%, 40%, 50%, 60%, 70%, 80%, 90% or 95% of the axial length of the second ion trap.

The first AC or RF voltage and the second AC or RF voltage preferably acts to create a radial pseudo-potential well or barrier which acts to confine ions at least radially within the first and second ion traps.

According to the preferred embodiment during the first scan, ions having mass to charge ratios in a range $M_1$min to $M_1$max either:

(i) are simultaneously ejected from the first ion trap at one or more instants in time during the first scan; and/or (ii) are not confined within the first ion trap at one or more instants in time during the first scan; and/or (iii) are free to exit the first ion trap in at least one direction at one or more instants in time during the first scan; and/or (iv) may emerge from the first ion trap at one or more instants in time during the first scan.

According to the preferred embodiment during the second scan, ions having mass to charge ratios in a range $M_2$min to $M_2$max are either:

(i) simultaneously ejected from the second ion trap at one or more instants in time during the second scan; and/or (ii) are not confined within the second ion trap at one or more instants in time during the second scan; and/or (iii) are free to exit the second ion trap in at least one direction at one or more instants in time during the second scan; and/or (iv) may emerge from the second ion trap at one or more instants in time during the second scan.

Preferably, $M_1$max-$M_1$min>$M_2$max-$M_2$min for at least 5%, 10%, 15%, 20% 25%, 30%, 35%, 40%, 45%, 50%, 55%, 60%, 65%, 70%, 75%, 80%, 85%, 90% or 95% of the overall duration of the first scan and the second scan as measured from the start of the first scan to the end of the second scan.

According to the preferred embodiment either:

(i) the second scan is commenced simultaneously for a period of time with the first scan; and/or (ii) the second scan is commenced before or after the first scan is completed; and/or (iii) the first scan is completed simultaneously with the second scan; and/or (iv) the first scan is completed before or after the second scan is completed.

According to the preferred embodiment, there is a delay time ΔTdelay1 between the commencement of the first scan and the second scan and/or wherein there is a delay time ΔTdelay2 between the completion of the first scan and the second scan, wherein ΔTdelay1 and/or ΔTdelay2 are preferably selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

According to the preferred embodiment either:

(i) ions having mass to charge ratios within a range $M_1$min to $M_1$max are ejected from the first ion trap in a single scan and/or in a substantially continuous manner; and/or (ii) ions having mass to charge ratios within a range $M_2$min to $M_2$max are ejected from the second ion trap in a single scan and/or in a substantially continuous manner.

The second scan is preferably commenced after the first scan is commenced and/or after the first scan is completed.

According to an embodiment either:

(i) ions having mass to charge ratios within a range $M_1$min to $M_1$max are ejected from the first ion trap in a plurality of scans and/or in a substantially discontinuous manner; and/or (ii) ions having mass to charge ratios within a range $M_2$min to $M_2$max are ejected from the second ion trap in a plurality of scans and/or in a substantially discontinuous manner.

Preferably, ions having mass to charge ratios within a range $M_1$min to $M_1$max and/or $M_2$min to $M_2$max are ejected from the first ion trap and/or the second ion trap in at least 2, 3, 4, 5, 6, 7, 8, 9, 10, 11, 12, 13, 14, 15, 16, 17, 18, 19 or 20 separate or discrete scans.

The control system is preferably further arranged and adapted:

(i) to cause the first ion trap to mass selectively eject at least some ions out of the first ion trap during a third scan, wherein at least some of the ions which are mass selectively ejected from and/or which emerge from the first ion trap are subsequently received by and stored or trapped in or within the second ion trap; and (ii) to cause the second ion trap to mass selectively eject at least some ions out of the second ion trap during a fourth scan.

The third scan is preferably commenced at a time $T_3$start and is preferably completed at a subsequent time $T_3$end and wherein the fourth scan is commenced at a time $T_4$start and is preferably completed at a subsequent time $T_4$end, and wherein either:

(i) $T_4$Lend>$T_3$end>$T_4$start>$T_3$start; or (ii) $T_4$end>$T_4$start>$T_3$end>$T_3$start;

According to the preferred embodiment:

(a) the duration of the third scan $T_3$end-$T_3$start is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s; and/or (b) the duration of the fourth scan $T_4$end-$T_4$start is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s; and/or (c) the overall duration of the third scan and the fourth scan as measured from the start of the third scan to the end of the fourth scan $T_4$end-$T_3$start is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

The first ion trap and the second ion trap are preferably simultaneously scanned for at least 5%, 10%, 15%, 20%, 25%, 30%, 35%, 40%, 45%, 50%, 55%, 60%, 65%, 70%, 75%, 80%, 85%, 90% or 95% of either:

(i) the duration of the third scan $T_3$end-$T_3$start; and/or (ii) the duration of the fourth scan $T_4$end-$T_4$start; and/or (iii) the overall duration of the third scan and the fourth scan as measured from the start of the third scan to the end of the fourth scan $T_4$end-$T_3$start.

The control system is preferably farther arranged and adapted:

(i) to cause the first ion trap to mass selectively eject at least some ions out of the first ion trap during a fifth scan, wherein at least some of the ions which are mass selectively ejected from and/or which emerge from the first ion trap are subsequently received by and stored or trapped in or within the second ion trap; and (ii) to cause the second ion trap to mass selectively eject at least some ions out of the second ion trap during a sixth scan.

The fifth scan is preferably commenced at a time $T_5$start and is preferably completed at a subsequent time $T_5$end and wherein the sixth scan is commenced at a time $T_6$start and is preferably completed at a subsequent time $T_6$end, and wherein either:

(i) $T_6$end>$T_5$end>$T_6$start>$T_5$start; or (ii) $T_6$end>$T_6$start>$T_5$end>$T_5$start.

According to the preferred embodiment:

(a) the duration of the fifth scan $T_5$end-$T_5$start is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s; and/or (b) the duration of the sixth scan $T_6$end-$T_6$start is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 Ms; (xiv) 300-400 ms; (xv) 400-500 ms; (xvi) 500-600 ms; (xvii) 600-700 ms; (xviii) 700-800 ms; (xix) 800-900 ms; xx) 900-1000 ms; (xxi) 1-2 s; (xxii) 2-3 s; (xxiii) 3-4 s; xxiv) 4-5 s; and (xxv) >5 s; and/or (c) the overall duration of the fifth scan and the sixth scan as measured from the start of the fifth scan to the end of the sixth scan $T_6$end-$T_5$start is selected from the group consisting of: (i) <1 ms; (ii) 1-10 ms; (iii) 10-20 ms; (iv) 20-30 ms; (v) 30-40 ms; (vi) 40-50 s; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

The first ion trap and the second ion trap are preferably simultaneously scanned for at least 5%, 10%, 15%, 20%, 25%, 30%, 35%, 40%, 45%, 50%, 55%, 60%, 65%, 70%, 75%, 80%, 85%, 90% or 95% of either:

(i) the duration of the fifth scan $T_5$end-$T_5$start; and/or (ii) the duration of the sixth scan $T_6$end-$T_6$start; and/or (iii) the overall duration of the fifth scan and the sixth scan as measured from the start of the fifth scan to the end of the sixth scan $T_6$end-$T_5$start.

The control system is preferably further arranged and adapted:

(i) to cause the first ion trap to mass selectively eject at least some ions out of the first ion trap during a seventh scan, wherein at least some of the ions which are mass selectively ejected from and/or which emerge from the first ion trap are subsequently received by and stored or trapped in or within the second ion trap; and (ii) to cause the second ion trap to mass selectively eject at least some ions out of the second ion trap during an eighth scan.

The seventh scan is preferably commenced at a time $T_7$start and is preferably completed at a subsequent time $T_7$end and wherein the eighth scan is commenced at a time $T_8$start and is preferably completed at a subsequent time $T_8$end, and wherein either:

(i) $T_8$end>$T_7$end>$T_8$start>$T_7$start; or (ii) $T_8$end>$T_8$start>$T_7$end>$T_7$start.

According to the preferred embodiment:

(a) the duration of the seventh scan $T_7$end-$T_7$start is selected from the group consisting of: (1) <1 ms; (ii) 1-10 ms; (iii) 10-20 ms; (iv) 20-30 ms; (v) 30-40 ms; (vi) 40-50 ms; 50-60 ms; (viii) 60-70 ms; (ix) 70-80 ms; (x) 80-90 ms; (xi) 90-100 ms; (xii) 100-200 ms; (xiii) 200-300 ms; (xiv) 300-

400 ms; (xv) 400-500 ms; (xvi) 500-600 ms; (xvii) 600-700 ms; (xviii) 700-800 ms; (xix) 800-900 ms; xx) 900-1000 ms; (xxi) 1-2 s; (xxii) 2-3 s; (xxiii) 3-4 s; (xxiv) 4-5 s; and (xxv) >5 s; and/or (b) the duration of the eighth scan $T_8$end-$T_8$start is selected from the group consisting of: (i) <1 ms; (ii) 1-10 ms; (iii) 10-20 ms; (iv) 20-30 ms; (v) 30-40 ms, (vi) 40-50 ms; (vii) 50-60 ms; (viii) 60-70 s; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s; and/or (c) the overall duration of the seventh scan and the eighth scan as measured from the start of the seventh scan to the end of the eighth scan $T_8$end-$T_7$start is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

The first ion trap and the second ion trap are preferably simultaneously scanned for at least 5%, 10%, 15%, 20%, 25%, 30%, 35%, 40%, 45%, 50%, 55%, 60%, 65%, 70%, 75%, 80%, 85%, 90% or 95% of either:

(i) the duration of the seventh scan $T_7$end-$T_7$start; and/or (ii) the duration of the eighth scan $T_8$end-$T_8$start; and/or (iii) the overall duration of the seventh scan and the eighth scan as measured from the start of the seventh scan to the end of the eighth scan $T_8$end-$T_7$start.

According to an embodiment:

(a) ions within a range M0 to M1 are ejected from the first ion trap during a first time period T0 to T1; and/or (b) ions within a range M0 to M1 are ejected from the second ion trap during a second time period T2 to T3; and/or (c) ions within a range M1 to M2 are ejected from the first ion trap during a third time period T4 to T5; and/or (d) ions within a range M1 to M2 are ejected from the second ion trap during a fourth time period T6 to T7; and/or (e) ions within a range M2 to M3 are ejected from the first ion trap during a fifth time period T8 to T9; and/or (e) ions within a range M2 to M3 are ejected from the second ion trap during a sixth time period T10 to T11;

wherein

T11>T10>T9>T8>T7>T6>T5>T4>T3>T2>T1>T0; and/or wherein M3>M2>M1>M0.

According to an embodiment, during at least 5%, 10%, 15%, 20%, 25%, 30%, 35%, 40%, 45%, 50%, 55%, 60%, 65%, 70%, 75%, 80%, 85%, 90%, 95% or 100% of the first scan and/or the second scan and/or the third scan and/or the fourth scan and/or the fifth scan and/or the sixth scan and/or the seventh scan and/or the eighth or subsequent scans the total charge and/or number of ions present within the second ion trap is either:

(i) substantially less than the total charge and/or number of ions present within the first ion trap; and/or (ii) ≤5%, ≤10%, ≤15%, ≤20%, ≤25%, ≤30%, ≤35%, ≤40%, <45%, ≤50%, ≤55%, ≤60%, ≤65%, ≤70%, ≤75%, ≤80%, ≤85%, ≤90% or ≤95% of the total charge and/or number of ions present within the first ion trap.

The mass spectrometer preferably further comprises a device arranged and adapted to vary, adjust, alter, increase or decrease the transmission of at least some ions ejected from the first ion trap so as to control, limit or restrict the ions which are transmitted to and/or received by the second ion trap.

The device may comprise:

(i) an attenuation lens which is regularly switched back and forth between a first relatively high transmission mode of operation wherein the attenuation lens focuses or defocus a beam of ions to a first degree, and a second relatively low transmission mode of operation wherein the attenuation lens substantially focuses or defocuses a beam of ions to a second different degree; and/or (ii) an attenuation lens comprising an Einzel lens comprising one or more front electrodes and/or one or more intermediate electrodes and/or one or more rear electrodes, wherein: (a) the one or more front electrodes are arranged to be maintained, in use, at substantially the same DC voltage; and/or (b) a variable DC voltage is arranged to be applied to the one or more intermediate electrodes so as to vary the degree of focusing or defocusing; and/or (c) the one or more rear electrodes are arranged to be maintained, in use, at substantially the same DC voltage.

The device may comprise:

(i) an ion beam attenuator for transmitting and attenuating a beam of ions, wherein, in use, the ion beam attenuator is repeatedly switched between a first mode of operation for a time period $\Delta T_1$ wherein the ion transmission is substantially 0% and a second mode of operation for a time period $\Delta T_2$ wherein the ion transmission is >0% and wherein, in use, the mark space ratio $\Delta T_2/\Delta T_1$ is adjusted in order to adjust or vary the transmission or attenuation of the ion beam attenuator; and/or (ii) an ion beam attenuator which is arranged and adapted to have an average or overall transmission of x %, wherein x is selected from the group consisting of: (i) <0.01; (ii) 0.01-0.05; (iii) 0.05-0.1; (iv) 0.1-0.5; (v) 0.5-1.0; (vi) 1-5; (vii) 5-10; (viii) 10-15; (ix) 15-20; (x) 20-25; (xi) 25-30; (xii) 30-35; (xiii) 35-40; (xiv) 40-45; (xv) 45-50; (xvi) 50-55; (xvii) 55-60; (xiii) 60-65; (xix) 65-70; (xx) 70-75; (xxi) 75-80; (xxii) 80-85; (xxiii) 85-90; (xxiv) 90-95; and (xxv) > 95; and/or (iii) an ion beam attenuator which is switched between a first mode of operation and a second mode of operation with a frequency of: (i) <1 Hz; (ii) 1-10 Hz; (iii) 10-50 Hz; (iv) 50-100 Hz; (v) 100-200 Hz; (vi) 200-300 Hz; (vii) 300-400 Hz; (viii) 400-500 Hz; (ix) 500-600 Hz; (x) 600-700 Hz; (xi) 700-800 Hz; (xii) 800-900 Hz; (xiii) 900-1000 Hz; (xiv) 1-2 kHz; (xv) 2-3 kHz; (xvi) 3-4 kHz; (xvii) 4-5 kHz; (xviii) 5-6 kHz; (xix) 6-7 kHz; (xx) 7-8 kHz; (xxi) 8-9 kHz; (xxii) 9-10 kHz; (xxiii) 10-15 kHz; (xxiv) 15-20 kHz; (xxv) 20-25 kHz; (xxvi) 25-30 kHz; (xxvii) 30-35 kHz; (xxviii) 35-40 kHz; (xxix) 40-45 kHz; (xxx) 45-50 kHz; and (xxxi) >50 kHz.

According to an embodiment either:

(i) $\Delta T_1 > \Delta T_2$ or $\Delta T_1 \leq \Delta T_2$; and/or (ii) the time period $\Delta T_1$ is selected from the group consisting of: (i) <0.1 μs; (ii) 0.1-0.5 μs; (iii) 0.5-1 μs; (iv) 1-50 μs; (v) 50-100 μs; (vi) 100-150 μs; (vii) 150-200 μs; (viii) 200-250 μs; (ix) 250-300 μs; (x) 300-350 μs; (xi) 350-400 μs; (xii) 400-450 μs; (xiii) 450-500 μs; (xiv) 500-550 μs; (xv) 550-600; (xvi) 600-650 μs; (xvii) 650-700 μs; (xviii) 700-750 μs; (xix) 750-800 μs; (xx) 800-850 μs; (xxi) 850-900 μs; (xxii) 900-950 μs; (xxiii) 950-1000 μs; (xxiv) 1-10 ms; (xxv) 10-50 ms; (xxvi) 50-100 ms; (xxvii) >100 ms; and/or (iii) the time period $\Delta T_2$ is selected from the group consisting of: (i) <0.1 μs; (ii) 0.1-05 μs; (iii) 0.5-1 μs; (iv) 1-50 μs; (v) 50-100 μs; (vi) 100-150 μs; (vii) 150-200 μs; (viii) 200-250 μs; (ix) 250-300 μs; (x) 300-350 μs; (xi) 350-400 μs; (xii) 400-450 μs; (xiii) 450-500 μs; (xiv) 500-550 μs; (xv) 550-600; (xvi) 600-650 μs; (xvii) 650-700 μs; (xviii) 700-750 μs; (xix) 750-800 μs; (xx) 800-850 μs; (xxi) 850-900 μs; (xxii)

900-950 μs; (xxiii) 950-1000 μs; (xxiv) 1-10 ms; (xxv) 10-50 ms; (xxvi) 50-100 ms; (xxvii) >100 ms.

The mass spectrometer preferably further comprises a control device which is arranged and adapted to adjust or vary either the time period $\Delta T_1$ and/or the time period $\Delta T_2$ based upon either:

(i) an ion current as measured by an ion detector; and/or (ii) the intensity of one or more mass peaks; and/or (iii) a sensing device or ion detector arranged between the first ion trap and the second ion trap.

According to the preferred embodiment:

(a) in the event that one or more mass peaks in one or more mass spectra are determined as suffering from saturation effects or are determined as approaching saturation then either the time period $\Delta T_1$ and/or the time period $\Delta T_2$ is adjusted or varied; and/or (b) in the event that mass data or mass spectral data are determined as suffering from saturation effects or are determined as approaching saturation then either the time period $\Delta T_1$ and/or the time period $\Delta T_2$ is adjusted or varied; and/or (c) in the event of an ion current or an output from a sensing device being determined to exceed a certain level or threshold then either the time period $\Delta T_1$ and/or the time period $\Delta T_2$ is adjusted or varied.

The device may comprise one or more electrostatic lenses, wherein in the first mode of operation a voltage is applied to one or more electrodes of the device, wherein the voltage causes an electric field to be generated which acts to retard and/or deflect and/or reflect and/or divert the beam of ions.

The mass spectrometer preferably further comprises an ion mobility separator or spectrometer arranged between the first ion trap and the second ion trap. Other embodiments are contemplated wherein an ion mobility separator or spectrometer is arranged upstream and/or downstream of the first ion trap and/or the second ion trap.

The control system is preferably arranged and adapted to mass selectively eject ions having masses or mass to Charge ratios between a first upper threshold $\mathbf{M1}_{max}$ and a first lower threshold $\mathbf{M1}_{min}$ at an instant in time and wherein the control system is preferably arranged and adapted to mass selectively eject ions having masses or mass to charge ratios between a second upper threshold $\mathbf{M2}_{max}$ and a second lower threshold $\mathbf{M2}_{min}$ at an instant in time, and wherein $\mathbf{M1}_{max}-\mathbf{M1}_{min}>\mathbf{M2}_{max}-\mathbf{M2}_{min}$.

In a mode of operation, at least some ions are preferably arranged to be fragmented in one or more upstream and/or intermediate and/or downstream regions of the first ion trap and/or the second ion trap.

In a mode of operation, ions are preferably arranged to be fragmented within the first ion trap and/or the second ion trap by: (i) Collisional Induced Dissociation ("CID"); (ii) Surface Induced Dissociation ("SID"); (iii) Electron Transfer Dissociation ("ETD"); (iv) Electron Capture Dissociation ("ECD"); (v) Electron Collision or Impact Dissociation; (vi) Photo Induced Dissociation ("PID"); (vii) Laser Induced Dissociation; (viii) infrared radiation induced dissociation; (ix) ultraviolet radiation induced dissociation; (x) thermal or temperature dissociation; (xi) electric field induced dissociation; (xii) magnetic field induced dissociation; (xiii) enzyme digestion or enzyme degradation dissociation; (xiv) ion-ion reaction dissociation; (xv) ion-molecule reaction dissociation; (xvi) ion-atom reaction dissociation; (xvii) ion-metastable ion reaction dissociation; (xviii) ion-metastable molecule reaction dissociation; (xix) ion-metastable atom reaction dissociation; and (xx) Electron Ionisation Dissociation ("EID").

In a mode of operation, the first ion trap and/or the second ion trap are preferably maintained, in a mode of operation, at a pressure selected from the group consisting of: (i) >100 mbar; (ii) >10 mbar; (iii) >1 mbar; (iv) >0.1 mbar; (v) $>10^{-2}$ mbar; (vi) $>10^{-3}$ mbar; (vii) $>10^{-4}$ mbar; (viii) $>10^{-5}$ mbar; (ix) $>10^{-6}$ mbar; (x) <100 mbar; (xi) <10 mbar; (xii) <mbar; (xiii) <0.1 mbar; (xiv) $<10^{-2}$ mbar; (xv $<10^{-3}$ mbar; (xvi) $<10^{4}$ mbar; (xvii) $<10^{-5}$ mbar; (xviii) $<10^{-6}$ mbar; (xix) 10-100 mbar; (xx) 1-10 mbar; (xxi) 0.1-1 mbar; (xxii) $10^{-2}$ to $10^{-1}$ mbar; (xxiii) $10^{-3}$ to $10^{-2}$ mbar; (xxiv) $10^{-4}$ to $10^{-3}$ mbar; and (xxv) $10^{-5}$ to $10^{-4}$ mbar.

In a mode of operation, at least some ions are preferably arranged to be separated temporally according to their ion mobility or rate of change of ion mobility with electric field strength as they pass along at least a portion of the length of the first ion trap and/or the second ion trap.

The mass spectrometer preferably further comprises:

(i) a device or ion gate for pulsing ions into the first ion trap and/or the second ion trap; and/or (ii) a device for converting a substantially continuous ion beam into a pulsed ion beam.

The mass spectrometer preferably further comprises either:

(a) an ion source arranged upstream of the first ion trap and/or the second ion trap, wherein the ion source is selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray ionisation ("DESI") ion source; (xvi) a Nickel-63 radioactive ion source; (xvii) an Atmospheric Pressure Matrix Assisted Laser Desorption Ionisation ion source; and (xviii) a Thermospray ion source; and/or (b) one or more ion guides arranged upstream and/or downstream of the first ion trap and/or the second ion trap; and/or (c) one or more ion mobility separation devices and/or one or more Field Asymmetric Ion Mobility Spectrometer devices arranged upstream and/or downstream of the first ion trap and/or the second ion trap; and/or (d) one or more ion traps or one or more ion trapping regions arranged upstream and/or downstream of the first ion trap and/or the second ion trap; and/or (e) one or more collision, fragmentation or reaction cells arranged upstream and/or downstream of the first ion trap and/or the second ion trap, wherein the one or more collision, fragmentation or reaction cells are selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation is ("PID") fragmentation device; (vii) a Laser induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an ion-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to fowl adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix an Electron Ionisation Dissociation ("EID") fragmentation device and/or (f) a mass analyser selected from the group consisting of (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (g) one or more energy analysers or electrostatic energy analysers arranged upstream and/or downstream of the first ion trap and/or the second ion trap; and/or (h) one or more ion detectors arranged upstream and/or downstream of the first ion trap and/or the second ion trap; and/or (i) one or more mass filters arranged upstream and/or downstream of the first ion trap and/or the second ion trap, wherein the one or more mass filters are selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass-filter; and (vii) a Time of Flight mass filter.

According to an embodiment, the mass spectrometer may further comprise:

a C-trap; and an orbitrap mass analyser;

wherein in a first mode of operation ions are transmitted to the C-trap and are then injected into the orbitrap mass analyser; and wherein in a second mode of operation ions are transmitted to the C-trap and then to a collision cell wherein at least some ions are fragmented into fragment ions, and wherein the fragment ions are then transmitted to the C-trap before being injected into the orbitrap mass analyser.

According to an aspect of the present invention, e is provided a method of mass spectrometry comprising:

providing a first mass selective ion trap comprising a first plurality of electrodes and a second mass selective ion trap comprising a second plurality of electrodes, wherein the second mass selective ion trap is arranged downstream of the first mass selective ion trap;

arranging for a group of ions to be stored or trapped at an initial time T0 in or within the first ion trap;

causing the first ion trap to mass selectively eject at least some ions out of the first ion trap during a first scan, wherein at least some of the ions which are mass selectively ejected from and which emerge from the first ion trap are subsequently received by and stored or trapped in or within the second ion trap; and causing the second ion trap to mass selectively eject at least some ions out of the second ion trap during a second scan.

According to an aspect of the present invention, there is provided a computer program executable by a control system of a mass spectrometer comprising a first mass selective ion trap and a second mass selective ion trap arranged downstream of the first mass selective ion trap, the computer program being arranged to cause the control system:

(i) to arrange for a group of ions to be stored or trapped at an initial time T0 in or within the first ion trap;

(ii) to cause the first ion trap to mass selectively eject at least some ions out of the first ion trap during a first scan, wherein at least some of the ions which are mass selectively ejected from and which emerge from the first ion trap are subsequently received by and stored or trapped in or within the second ion trap; and (iii) to cause the second ion trap to mass selectively eject at least some ions out of the second ion trap during a second scan.

According to an aspect of the present invention, there is provided a computer readable medium comprising computer executable instructions stored on the computer readable medium, the instructions being arranged to be executable by a control system of a mass spectrometer comprising a first mass selective ion trap and a second mass selective ion trap arranged downstream of the first mass selective ion trap to cause the control system:

(i) to arrange for a group of ions to be stored or trapped at an initial time T0 in or within the first ion trap;

(ii) to cause the first ion trap to mass selectively eject at least some ions out of the first ion trap during a first scan, wherein at least some of the ions which are mass selectively ejected from and which emerge from the first ion trap are subsequently received by and stored or trapped in or within the second ion trap; and (iii) to cause the second ion trap to mass selectively eject at least some ions out of the second ion trap during a second scan.

The computer readable medium is preferably selected from the group consisting of: (i) a ROM; (ii) an EAROM; (iii) an EPROM; (iv) an EEPROM; (v) a flash memory; and (vi) an optical disk.

According to an aspect of the preset invention, there is provided a mass spectrometer comprising:

a first ion trap;

a second mass selective ion trap; and a control system arranged and adapted:

(i) to store ions in the first ion trap so as to control and/or limit and/or reduce the total charge and/or number of ions present within the second ion trap at one or more instants in time; and (ii) to scan at least some ions simultaneously out of the first ion trap and the second ion trap whilst ensuring that the total charge and/or number of ions present within the second ion trap is controlled and/or limited and/or reduced at one or more instants in time.

According to an aspect of the present invention, there is provided a method of mass spectrometry comprising:

providing a first ion trap and a second mass selective ion trap;

storing ions in the first ion trap so as to control and/or limit and/or reduce the total charge and/or number of ions present within the second ion trap at one or more instants in time; and scanning at least some ions simultaneously out of the first ion trap and the second ion trap whilst ensuring that the total charge and/or number of ions present within the second ion trap is controlled and/or limited and/or reduced at one or more instants in time.

According to an aspect of the present invention, there is provided a mass spectrometer comprising:

a first ion trap;

a second mass selective ion trap; and a control system arranged and adapted:

(i) to store ions in the first ion trap so as to control and/or limit and/or reduce the total charge and/or number of ions present within the second ion trap at one or more instants in time;

(ii) to scan at least some ions out of the first ion trap during a first time period and to receive at least some of the ions in the second ion trap whilst ensuring that the total charge and/or number of ions present within the second ion trap is controlled and/or limited and/or reduced at one or more instants in time; and (iii) to scan at least some ions out of the second ion trap during a second subsequent time period, wherein there is a non-zero delay time between the first time period and the second time period.

According to an aspect of the present invention, there is provided a method of mass spectrometry comprising:

providing a first ion trap and a second mass selective ion trap;

storing ions in the first ion trap so as to control and/or limit and/or reduce the total charge and/or number of ions present within the second ion trap at one or more instants in time;

scanning at least some ions out of the first ion trap during a first time period and to receive at least some of the ions in the second ion trap whilst ensuring that the total charge and/or number of ions present within the second ion trap is controlled and/or limited and/or reduced at one or more instants in time; and scanning at least some ions out of the second ion trap during a second subsequent time period, wherein there is a non-zero delay time between the first time period and the second time period.

The preferred embodiment relates to amass spectrometer and a method of mass spectrometry wherein the dynamic range of mass spectra which can be produced by scanning ions out from an ion trap is significantly improved.

According to an embodiment, the mass to charge ratio range of ions arranged to be present in an ion trap at any instant in time is preferably restricted, reduced or otherwise limited so that only ions having a limited range of mass to charge ratios will be present within the ion trap and will be subsequently analysed in order to produce a final mass spectrum. Limiting the ion population within the analytical ion trap at any instant in time during the analysis or scanning of ions from the ion trap preferably enables the dynamic range of the analytical ion trap to be increased.

According to an embodiment, ions are mass selectively or otherwise ejected from one or more high capacity (first) ion taps which are preferably provided upstream and/or downstream of an analytical or high performance (second) ion trap. The one or more high capacity (first) ion traps may comprise either one or more 3D or Paul ion traps and/or one or more 2D or linear ion traps.

According to an embodiment, ions may be attenuated by an attenuation factor as they are being transmitted from a high capacity or storage (first) ion trap to an analytical or high performance (second) ion trap. The attenuation factor may be varied during the course of generating a mass spectrum or otherwise during an experimental run. The transmission of ions may be attenuated, for example, by varying the transmission through a restrictive aperture and/or by switching the transmission of an ion gate ON/OFF with a variable mark space ratio.

According to an embodiment, an ion mobility spectrometer or separator may be positioned upstream and/or downstream of an analytical or high performance (second) ion trap. The ion mobility spectrometer or separator is preferably arranged to separate ions temporally according to their ion mobility through a buffer gas. The order in Which ions are injected into or arrive at the analytical (second) ion trap may be determined by the mobility of the ions in gas phase.

The analytical or high performance (second) ion trap preferably comprises a 3D or Paul ion trap and/or a 2D or linear ion trap.

Ions may be ejected either radially and/or axially from the high capacity or storage (first) ion trap and/or from the analytical or high performance (second) ion trap.

Ions are preferably confined within the high capacity or storage (first) ion trap and/or within the analytical or high performance (second) ion trap by RF confinement or by a combination of FY and DC voltages which may be applied to at least some of the electrodes comprising the high capacity or storage (first) ion trap and/or the analytical or high performance (second) ion trap.

BRIEF DESCRIPTION OF THE DRAWINGS

Various embodiments of the present invention will now be described, by way of example, and with reference to the accompanying drawings in which.

DETAILED DESCRIPTION OF THE PREFERRED EMBODIMENTS

Figure 1:
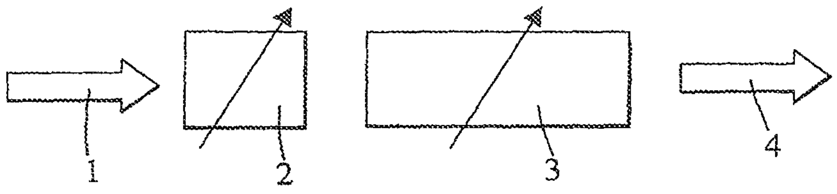
FIG. 1 shows an embodiment of the present invention wherein a storage or first ion trap is provided upstream of a high performance analytical or second ion trap.

A preferred embodiment of the present invention will now be described with reference to FIG. 1. According to the preferred embodiment, a beam or pulse of ions 1 is preferably introduced into or is transmitted to a first ion trap 2. The first ion trap 2 preferably has a relatively high capacity and is preferably used or operated as a storage ion trap in at least one mode of operation. The beam or pulse of ions 1 may be generated by a pulsed ion source such as a Laser Desorption Ionisation ("LDI") ion source, a Matrix Assisted Laser Desorption Ionisation ("MALDI") ion source or a Desorption/Ionisation on Silicon ("DIOS") ion source.

Alternatively, the beam or pulse of ions 1 may be generated by a continuous ion source. If a continuous ion source is provided then an additional ion trap (not shown) may also be provided upstream of the first ion trap 2. The additional ion trap preferably receives ions from the ion source and stores the ions in the ion trap. The additional ion trap may be arranged to release or eject ions periodically so that one or more pulses of ions are preferably onwardly transmitted to the first ion trap 2. The continuous ion source may comprise an Electrospray Ionisation ("ESI") ion source, an Atmospheric Pressure Chemical Ionisation ("APCI") ion source, an Electron Impact ("EI") ion source, an Atmospheric Pressure Photon Ionisation ("APPI") ion source, a Chemical Ionisation ("CI") ion source, a Desorption Electrospray Ionisation ("DESI") ion source, an Atmospheric Pressure MALDI ("AP-MALDI") ion source, a Fast Atom Bombardment ("FAB") ion source, a Liquid Secondary Ion Mass Spectrometry ("LSIMS") ion source, a Field Ionisation ("FI") ion source or a Field Desorption ("FD") ion source. Other continuous or pseudo-continuous ion sources may also be used.

Ions are preferably arranged to reside within the upstream or storage ion trap 2 for a sufficient period of time in order to cool to near thermal energies by collisions with buffer gas molecules which are preferably present within the first ion trap 2.

According to another embodiment, ions may be ejected or transmitted from a separate analytical device or from a fragmentation device arranged upstream of the first ion trap 2. Ions are preferably onwardly transmitted by the analytical device or the fragmentation device and are then received by the first ion trap 2.

A subset of the ions stored within the first ion trap 2 are preferably ejected or mass selectively ejected from the first ion trap 2 and are preferably transmitted to a second ion trap 3 which is preferably arranged downstream of the first ion trap 2. The second ion trap 3 preferably comprises an analytical or high performance ion trap. According to an embodiment, the second ion trap 3 may be arranged to have or may be operated so as to have a substantially higher mass or mass to charge ratio resolution than the first ion trap 1 The ions which are ejected from or which emerge from the first ion trap 2 at any instant in time may have a relatively wide range or spread of mass to charge ratios. The ions which are ejected from or which emerge from the first ion trap 2 are preferably ejected into or transmitted to the second downstream analytical ion trap 3. According to an embodiment, the first ion trap 2 may be arranged to have or may be operated so as to have a lower analytical performance than that of the second ion trap 3.

According to an embodiment, more charge may preferably allowed to reside within the first ion trap 2 as the first ion trap 2 is being scanned than would otherwise be acceptable in terms of charge residing within the second ion trap 3 as the second ion trap 3 is being scanned.

Ions injected from the first ion trap 2 into the second ion trap 3 are preferably allowed sufficient time to cool to near thermal energies by collisions with buffer gas molecules present within the second ion trap 3 before the ions are then ejected, mass selectively ejected or otherwise emerge from the second ion trap 3. Ions within the second ion trap 3 are preferably mass selectively ejected or emerge from the second ion trap 3 and the ions 4 are preferably directed or transmitted towards an ion detector or another ion-optical device arranged downstream of the second ion trap 3 (not shown) for further processing. According to an embodiment, ions may be passed from the second ion trap 3 to an analytical device such as a Time of Flight mass analyser, a Fourier Transform mass analyser or a fragmentation device.

Figure 2:
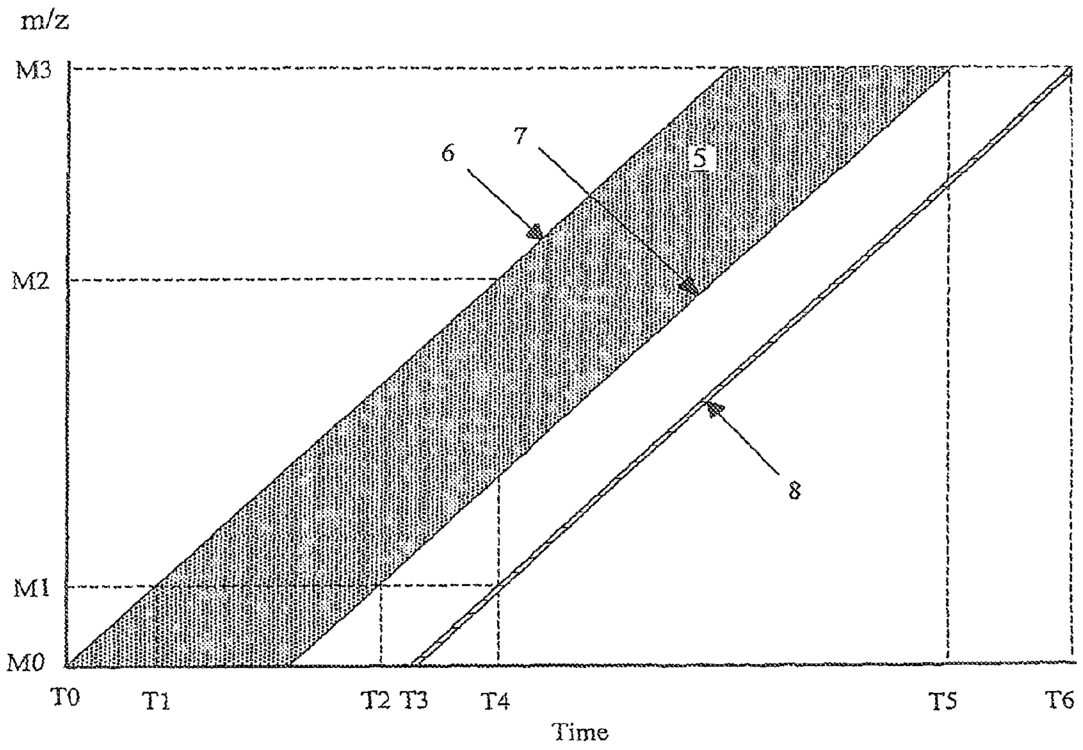
FIG. 2 Shows a plot of the mass to charge ratio of ions scanned out of a storage (first) ion trap and from an analytical (second) ion trap as a function of time according to an embodiment wherein ions are mass selectively ejected from both the storage ion trap and the analytical ion trap in a continuous and synchronised manner.

According to a preferred embodiment, ions are preferably ejected or arranged to emerge from the two mass selective ion traps 2, 3 in a substantially continuous manner during a mode of operation. FIG. 2 illustrates an embodiment wherein ions having different mass to charge ratio ranges are substantially continuously and simultaneously ejected or arranged to emerge from both ion traps 2, 3 during a mode of operation.

The broad shaded region 5 in FIG. 2 shows time intervals during which ions having mass to charge ratios within a relatively wide first range are ejected or may emerge from the first ion trap 2 as the first ion frap 2 is being scanned. The upper boundary line 6 indicates the earliest time at Which ions having a particular mass to charge ratio may be ejected or may emerge from the first ion trap 2 taking into consideration the performance characteristics of the first ion trap 2 and the effects of distortion in performance due to the space charge effects resulting from excessive number of charges being simultaneously present within the first ion trap 2. The lower boundary line 7 indicates the latest time at which ions having a particular mass to charge ratio are likely to be ejected or may emerge from the first ion trap 2 taking into consideration the performance characteristics of the first ion trap 2 and the effects of distortion in performance due to the space charge effects resulting from excessive number of charges being simultaneously present within the first ion trap 2.

The precise time of ejection or emergence of an ion having a particular mass to charge ratio may vary between the times bounded by the two boundary lines 6, 7 due to space charge distortion effects within the first ion trap 2.

The other narrow shaded region 8 shows the time intervals during which ions having particular mass to charge ratios are ejected or may emerge from the second or analytical ion trap 3 during an analytical scan of the second ion trap 3. The time period during which ions having a particular mass to charge ratio are ejected or may emerge from the second ion trap 3 is preferably relatively narrow or short and is relatively well defined compared to the corresponding time period or window during which ions having a particular mass to charge ratio may be ejected or may emerge from the first ion trap 2. It is assumed that there are an insufficient number of charges in the second ion trap 3 to lead to any significant distortion due to space charge effects. As a result, there is substantially very little if any uncertainty as to the time that an ion having a particular mass to charge will be ejected or will emerge from the second ion trap 3.

A preferred mode of operation will now be described in more detail with reference to FIG. 2. Ions from an ion source are preferably first collected and stored in the upstream or first ion trap 2 which preferably acts as a storage ion trap. The second ion trap 3 is preferably empty of ions. At an initial time T0, an analytical scan of the first ion trap 2 is preferably commenced. Ions having mass to charge ratios within a first relatively wide mass to charge ratio range are preferably ejected or may otherwise emerge from the first ion trap 2 at any instant in time and preferably enter or are received by the second downstream analytical ion trap 3. By way of illustration, the situation will be considered for ions having a first mass to charge ratio M1. Ions having a mass to charge ratio equal to M1 may be ejected or may emerge from the first ion trap 2 (and hence will be injected into or received by the second analytical ion trap 3) at any time between T1 and T2. This uncertainty in the ejection time is due to space charge distortion effects.

At a subsequent time T3 an analytical scan of the second ion trap 3 is preferably commenced. Ions having a mass to charge ratio equal to M1 are preferably arranged to be mass selectively ejected from the analytical ion trap 3 at a subsequent time T4. The time delay T4-T2 preferably ensures that ions ejected from the first ion trap 2 have a sufficient time to be received into the second or analytical ion trap 3 and to be subsequently cooled to near thermal energies due to collisions with buffer gas present within the second or analytical ion trap 3 before the ions are then mass selectively ejected from the second or analytical ion trap 3. There is very little if any uncertainty in the ejection time T4 since the second ion trap 3 does not suffer from space charge distortion effects.

At subsequent time T4 when ions having a mass to charge ratio equal to M1 are ejected or emerge from the second or analytical ion trap 3, ions having mass to charge ratios within the range M1 to M2 may in theory be present within the second or analytical ion trap 3. Ions having mass to charge ratios greater than M2 will still reside within the first ion trap 2 since such ions will not yet have been ejected or caused to emerge from the first ion trap 2. Ions having mass to charge ratios less than M1 will already have been ejected or caused to emerge from the second ion trap 3 and so will no longer reside in either the first ion trap 2 or the second ion trap 3. Therefore, at time T4 when ions having a mass to charge ratio M1 are ejected from the second ion trap 3, ions having a mass to charge ratio greater than M2 and ions having a mass to charge ratio less than M1 will not contribute to the density of charge present within the second ion trap 3. Therefore, the analytical performance characteristics of the second ion trap 3 are preferably not adversely affected by space charge saturation effects. It will be understood by those skilled in the art that space charge saturation effects will lead to an uncertainty as to when exactly ions having a specific mass or mass to charge ratio will actually emerge from an ion trap as a mass selective parameter of the ion trap is scanned. Space charge saturation effects can, for example, cause ions to be ejected in a premature or delayed manner.

Ions having the highest mass to charge ratio M3 which are desired to be analysed will all have been transferred from or ejected from the first ion trap 2 and will have been passed to the second ion trap 3 by time T5. The analytical scan of the upstream ion trap 2 may therefore be stopped at time T5. However, the analytical scan of the second ion trap 3 is preferably continued until a subsequent time T6 at which time all ions having a mass to charge ratio equal to M3 will have been ejected or will have emerged from the second ion trap 3.

Figure 3:
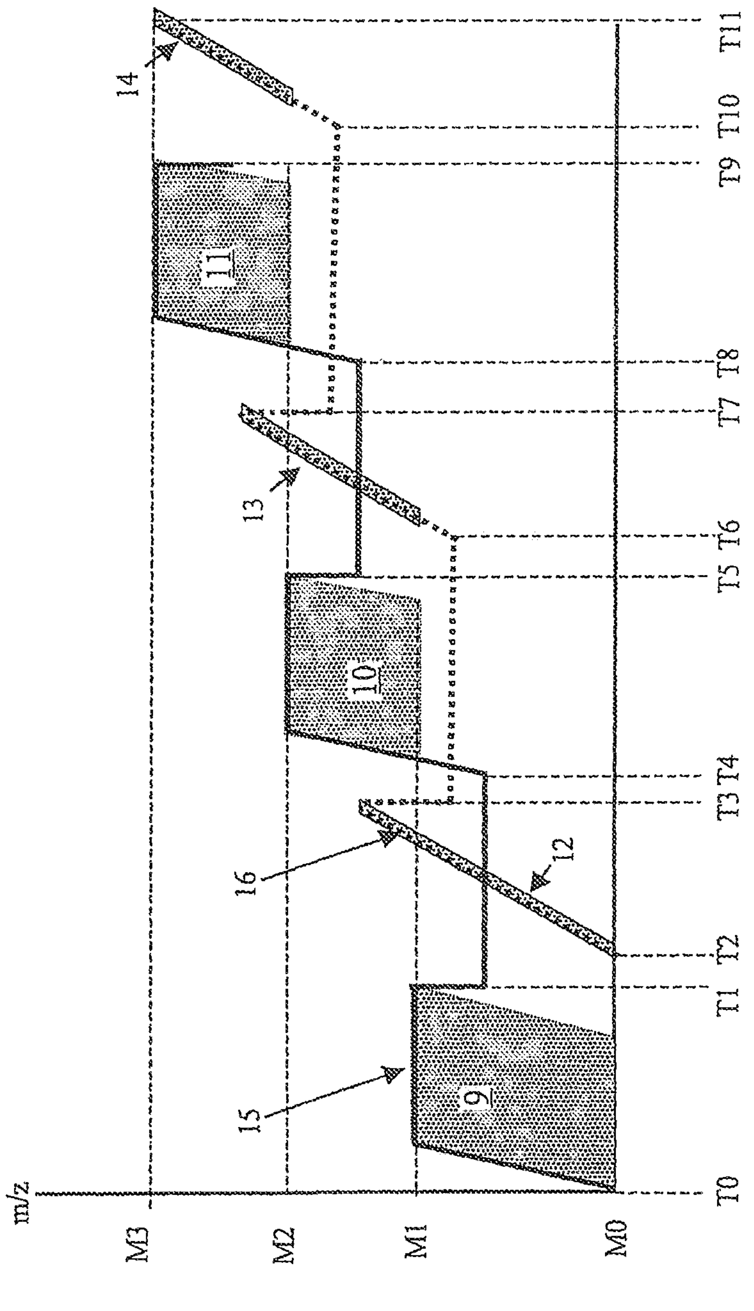
FIG. 3 shows a plot of the mass to charge ratio of ions scanned out of a storage (first) ion trap and from an analytical (second) ion trap as a function of time according to an alternative embodiment wherein ions are mass selectively ejected from the storage ion trap and the analytical ion trap in a discontinuous manner.

FIG. 3 illustrates an alternative embodiment of the present invention wherein ions are ejected from the first ion trap 2 and the second ion trap 3 in a substantially discontinuous manner in accordance with a stepped mode of operation. In the example shown in FIG. 3, which will be discussed in more detail below, ions are preferably ejected from the first ion trap 2 and the second ion trap 3 in ascending order of mass to charge ratio. However, ions may be transferred from the first ion trap 2 to the second analytical ion trap 3 in any order. Ions are preferably subsequently ejected from the second or analytical ion trap 3 for further processing.

The broad shaded regions or areas 9, 10, 11 shown in FIG. 3 show the time intervals during which ions having particular mass to charge ratios are ejected or otherwise emerge from the first ion trap 2 during a sequence of three separate analytical scans. The diagonal boundaries of the three main shaded regions or areas 9, 10, 11 indicate the earliest and latest times at which ions having specific mass to charge ratios may be ejected or emerge from the first ion trap 2 taking into consideration the performance characteristics of the first ion trap 2 and the effects of distortion in terms of performance due to the space charge effects resulting from an excessive number of charges residing within the first ion trap 2. The time of ejection or emergence of individual ions having a particular mass to charge ratio may vary between the boundary lines due to space charge saturation effects.

The other narrow shaded regions or areas 12, 13, 14 show the corresponding time intervals during which ions having particular mass to charge ratios may be ejected or may emerge from the second or analytical ion trap 3 during an analytical scan of the second ion trap 3. The time period during which ions having a particular mass to charge ratio may be ejected or may emerge from the second analytical ion trap 3 is preferably relatively narrow and well defined relative to the corresponding time window that ions having a particular mass to charge ratio may be ejected from the first ion trap 2. It is assumed that the number of charges in the second analytical ion trap 3 at any one time is insufficient to lead to distortions in performance due to space charge effects. Therefore, there is very little if any uncertainty as to the precise ejection time of ions having a particular mass to charge ratio.

The solid bold line 15 in FIG. 3 indicates a parameter or parameters governing ion ejection or ion emergence from the first ion trap 2 which may be varied during the sequence of scans shown. The dotted bold line 16 in FIG. 3 indicates a parameter or parameters governing ion ejection or ion emergence from the second analytical ion trap 3 which may be varied during the sequence of scans shown. The parameter(s) may relate to the amplitude or frequency of an AC and/or DC voltage applied to the electrodes of the first ion trap 2 and/or the second ion trap 3. Ions may be ejected by resonance ejection, Mass selective instability, parametric or nonlinear resonance or by non-resonant techniques.

At time T0 the conditions within the first ion trap 2 are preferably changed such that a parameter or parameters governing ion ejection or ion emergence is preferably scanned rapidly to a value such that ions having mass to charge ratios in the range M0-M1 are ejected or otherwise emerge from the first ion trap 2. The conditions within the first ion trap 2 are preferably held constant until time T1 at which time the conditions within the first ion trap 2 are then preferably altered to a level such that all of the ions remaining within the first ion trap 2 are preferably stable and no more ions are preferably ejected from the first ion trap 2 for a certain period of time.

During the time period from T0 to T1, all ions having mass to charge ratios within the range M0 to M1 will have been ejected or will have emerged from the first ion trap 2. It is possible that some ions having mass to charge ratios slightly greater than M1 may also have been ejected from the first ion trap 2 at time T1. This will depend upon the characteristics of the first ion trap 2 and on the presence and effect of an excessive number of ions within the first ion trap 2.

At time T2, a first analytical scan of the second analytical ion trap 3 is preferably commenced. The first analytical scan of the second ion trap 3 preferably continues until a subsequent time T3 at which time the entire population of ions within the second analytical ion trap 3 will preferably have been ejected from the second analytical ion trap 3. The time delay T2-T1 preferably ensures that sufficient time is allowed for ions having mass to charge ratios within the range M0 to M1 present within the second analytical ion trap 3 to cool to near thermal energies due to collisions with buffer gas within the second ion trap 3 before the ions are then ejected or caused to emerge from the second ion trap 3.

At subsequent time T3, the conditions within the second ion trap 3 are then preferably altered so that ions having mass to charge ratios greater than M1 are preferably arranged to be stable within the second ion trap 3.

At subsequent time T4, the conditions within the first ion trap 2 are preferably changed so that a parameter or parameters governing ion ejection or ion emergence is scanned rapidly to a value such that ions having mass to charge ratios in the range M1-M2 will be ejected or will emerge from the first ion trap 2. The conditions within the first ion trap 2 are preferably held constant until subsequent time T5 at which time the conditions within the first ion trap 2 are then preferably altered to a level such that all of the ions remaining within the first ion trap 2 are stable and no more ions are preferably ejected or will emerge from the first ion trap 2 for a certain period of time.

At subsequent time T6, a second analytical scan of the second analytical ion trap 3 is preferably commenced. The second analytical scan of the second ion trap 3 preferably Es continues until a subsequent time T7 at which time the entire population of ions within the second analytical ion trap 3 will preferably have been ejected or will have emerged from the second analytical ion trap 3. The time delay T6-T5 preferably ensures that sufficient time is allowed for ions having mass to charge ratios within the range M1 to M2 present within the second analytical ion trap 3 to cool to near thermal energies due to collisions with buffer gas within the second ion trap 3 before the ions are then ejected from the second ion trap 3.

At subsequent time T7, the conditions within the second analytical ion trap 3 are then preferably altered so that ions having mass to charge ratios greater than M2 will preferably be stable within the second ion trap 3.

At subsequent time T8, the conditions within the first ion trap 2 are preferably changed so that a parameter or parameters governing ion ejection or ion emergence is scanned rapidly to a value such that ions having mass to charge ratios in the range M2-M3 will be ejected or will otherwise emerge from the first ion trap 2. The conditions within the first ion trap 2 are preferably held constant until subsequent time T9 at which time all ions having the highest mass to charge ratio value to be analysed M3 will preferably have been ejected or will have emerged from the upstream or storage ion trap 2.

At subsequent time T10, a third and final analytical scan of the second analytical ion trap 3 is preferably commenced. The third analytical scan of the second ion trap 3 preferably continues until a subsequent time T11 at which time the entire population of ions within the second analytical ion trap 3 will preferably have been ejected or will have emerged from the second analytical ion trap 3. The analysis of the entire mass to charge ratio range of interest will then have been completed. The time delay T10-T9 preferably ensures that sufficient time is allowed for ions having mass to charge ratios within the range M2 to M3 present within the second analytical ion trap 3 to cool to near thermal energies due to collisions with buffer gas within the second ion trap 3 before the ions are then ejected from the second ion trap 3.

FIG. 3 illustrates an embodiment wherein three separate scans of the first and second ion traps 2, 3 are performed. However, other embodiments are contemplated wherein a different numbers of scans of the first and second ion traps 2, 3 are performed. For example, 2, 4, 5, 6, 7, 8, 9, 10, 11, 12, 13, 14, 15, 16, 17, 18, 19, 20 or more than 20 scans of the first and second ion traps 2, 3 may be performed.

The preferred embodiment preferably limits the mass to charge ratio range and/or number of ions present within the second analytical ion trap 3 whilst ions are being mass selectively ejected or scanned from the second analytical ion trap 3. Therefore, the population of ions during the analytical scan is preferably reduced in comparison with the total number of ions analysed over the whole analytical scan time. The dynamic range of the second analytical ion trap 3 is preferably increased since a large total ion population is preferably analysed but without the analytical performance of the second ion trap 3 being degraded by space charge effects.

Figure 4:
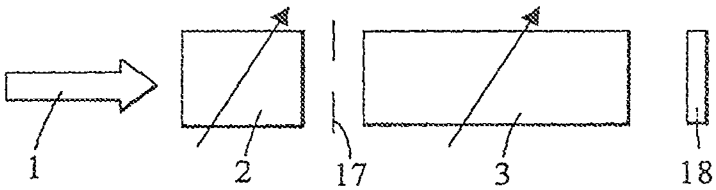
FIG. 4 shows an embodiment wherein ions which are ejected from a storage (first) ion trap are selectively attenuated by an attenuation device so as to control or limit the amount of charge or number of ions reaching a high performance analytical (second) ion trap.

According to another embodiment as will be described with reference to FIG. 4, the transmission of ions from the first ion trap 2 to the second analytical ion trap 3 may be varied, controlled or limited during mass selective ejection of ions from the first ion trap 2. This allows the population of ions entering the second ion trap 3 to be controlled, limited or restricted in a mass to charge ratio dependent manner during or prior to an analytical scan of the second analytical ion trap 3. The dynamic range of the second analytical ion trap 3 may be further increased by discriminating, for example, against ions having mass to charge ratios which have a relatively high abundance. According to this embodiment, the transmission of high abundance ions from the upstream ion trap 2 to the second analytical ion trap 3 may be set to a lower value than that of low abundance ions.

Mass or mass to charge ratio dependent attenuation of the ion population exiting the upstream ion trap 2 may be applied in either a discontinuous or stepped mode of operation or in a continuous or scanning mode of operation.

According to an embodiment, an attenuation lens 17 or other device may be provided between the first ion trap 2 and the second analytical ion trap 3. The attenuation lens 17 or other device may be capable of continuously adjusting the transmission of ions ejected or emerging from and transmitted by the first ion trap 2 to the second ion trap 3 during an analytical scan.

According to one embodiment, the attenuation lens 17 or other device may comprise a deflecting or focussing/defocussing electrostatic lens as disclosed, for example, in U.S. Pat. No. 6,878,929.

According to another embodiment, the attenuation lens 17 or other device may comprise a relatively fast electrostatic gate or shutter arranged between the first ion trap 2 and the second ion trap 3 to stop ions from entering the second ion trap 3 for relatively short periods of time when the gate or shutter is switched ON. The electrostatic gate or shutter preferably allows ions to enter the second ion trap 3 for relatively short periods of time when the gate or shutter is switched OFF. The mark space ratio of the gate or shutter can preferably be varied between 100% (or full transmission of ions) and 0% (or subsequently zero transmission of ions). The gate or shutter preferably effectively allows dynamic control of the total fill time of the ion trap for each mass to charge ratio range during the analytical scan.

An ion detector 18 may be arranged downstream of the second ion trap 3. Prior to performing an analytical scan of the second ion trap 3, the first ion trap 2 may first be scanned to ascertain, for example, an indication of the total charge likely to be present during an experimental run. In a mode of operation, ions may be mass selectively ejected from the first ion trap 2 and passed directly to the ion detector 18 to enable an initial mass spectrum and/or initial determination to be obtained or made. In this mode of operation, the second ion trap 3 may be operated as a high transmission linear ion guide. The mass spectrum preferably enables the maximum desired population of ions which is to be trapped within the second ion trap 3 to be estimated during an analytical scan of the first ion trap 2 and the second ion trap 3. This information may be used to adjust the transmission of ions between the first ion trap 2 and the second ion trap 3 as the analytical scan proceeds so as to prevent the second ion trap 3 from suffering from space charge saturation effects.

Other methods may be employed to record a mass spectrum produced by the first ion trap 2. For example, the first ion trap 2 may form part of a hybrid mass spectrometer including a Time of Flight mass analyser which is preferably arranged downstream of first ion trap 2. In this case, ions ejected from the first ion trap 2 may be directed to the downstream mass analyser for analysis.

Various farther embodiments are contemplated. According to an embodiment, a non-destructive or predominantly non-destructive ion detector or sensor device may be placed or located between the first ion trap 2 and the second ion trap 3. The signal produced by a proportion of ions incident upon, for example, a high transmission grid placed or located between the two ion traps 2, 3 or from a sensor device may be used to monitor the ion population exiting the first ion trap 2 before or during a scan of the second or analytical ion trap 3. This information may be used to adjust the population of ions allowed to enter the second analytical ion trap 3 as a function of time.

Various embodiments of the present invention are contemplated wherein ions may be mass selectively ejected from the first ion trap 2 and/or the second ion trap 3 by mass selective instability, resonance ejection, parametric or nonlinear resonance excitation or by non-resonant ejection techniques. Ions may be ejected axially and/or radially from the first ion trap 2 and/or the second ion trap 3. According to an embodiment, one or more tickle voltages may be applied to at least some of the electrodes of the first and/or second ion traps 2, 3 in order to mass selectively eject ions from the first ion trap 2 and/or the second ion trap 3.

Although the present invention has been illustrated by the provision of just two ion traps 2, 3 provided in series, other embodiments are contemplated wherein 3, 4, 5, 6, 7, 9, 10 or more than 10 ion traps may be provided in series and/or in parallel.

Although the present invention has been described with reference to preferred embodiments, it will be understood by those skilled in the art that various changes in farm and detail may be made without departing from the scope of the invention as set forth in the accompanying claims.

The invention claimed is:

1. A mass spectrometer comprising:

a first, mass selective ion trap or an ion mobility separator;

a second ion trap comprising a plurality of electrodes, wherein said second ion trap is arranged downstream of said first ion trap or ion mobility separator;

wherein in a mode of operation a group of ions is arranged to be within said first ion trap or ion mobility separator at an initial time T0;

said mass spectrometer further comprising:

a control system which is arranged and adapted:

(i) to cause ions to emerge from said first ion trap or ion mobility separator during a first scan, wherein at least some of said ions which emerge from said first ion trap or ion mobility separator are subsequently received by and stored or trapped in or within said ion second trap; and (ii) to cause said second ion trap to analyse or eject at least some ions out of said second ion trap during a second scan.

2. A mass spectrometer as claimed in claim 1, wherein said control system is further arranged and adapted such that said second scan is commenced after said first scan is completed.

3. A mass spectrometer as claimed in claim 1, further comprising a device or ion gate for pulsing ions into said ion mobility separator, wherein, in use, ions are arranged to reside within said ion mobility separator in order to cool to near thermal energies by collisions with buffer gas molecules which are present within said ion mobility separator.

4. A mass spectrometer as claimed in claim 1, wherein at said initial time T0 or for a time period ΔT thereafter said second ion trap is substantially empty of ions.

5. A mass spectrometer as claimed in claim 4, wherein said time period ΔT is selected from the group consisting of: (i)<0.1 μs; (ii) 0.1-0.5 μs; (iii) 0.5-1 μs; (iv) 1-5 μs; (v) 5-10 μs; (vi) 10-50 μs; (vii) 50-100 μs; (viii) 100-500 μS; (ix) 500-1000 us; (x) –5 ms; (xi) 5-10 ms; (xii) 10-50 ms; (xiii) 50-100 ms; (xiv) 100-500 ms; (xv) 500-1000 ms; and (xvi) >1 s.

6. A mass spectrometer as claimed in claim 1, wherein said second ion trap comprises:

an ion guide or ion trap comprising one or more first electrodes;

one or more exit electrodes arranged downstream of said first electrodes; and control means arranged to trap ions in a mode of operation within said ion guide or ion trap and to perform a plurality of cycles of operation, wherein in each cycle of operation at least some ions are enabled to exit said ion guide or ion trap during a first time period $T_e$ and thereafter ions are substantially prevented from exiting said ion guide or ion trap for a second time period $T_c$;

wherein said control means is further arranged to substantially prevent ions from entering said ion guide or ion trap whilst said plurality of cycles of operation are being performed and to vary the length or width of said first time period $T_e$ in subsequent cycles of operation.

7. A mass spectrometer as claimed in claim 1, wherein said first ion trap or ion mobility separator has or is operated to have a higher or greater ion storage or charge capacity in use than said second ion trap.

8. A mass spectrometer as claimed in claim 1, wherein in a mode of operation the total charge or number of ions present within said second ion trap is arranged to be substantially less than the total charge or number of ions present within said first ion trap or ion mobility separator.

9. A mass spectrometer as claimed in claim 1, wherein at one or more instants in time when ions are being ejected from said second ion trap the total charge or number of ions in or within said second ion trap is arranged either:

(i) to be less than the total charge or number of ions in or within said first ion trap or ion mobility separator; or (ii) to be less than the total charge or number of ions which were stored or trapped at said initial time T0 in or within said first ion trap or ion mobility separator.

10. A mass spectrometer as claimed in claim 1, wherein in a mode of operation the mass or mass to charge ratio resolution R2 of said second ion trap is substantially higher or is arranged to be substantially higher than the mass or mass to charge ratio resolution R1 of said first ion trap or ion mobility separator.

11. A mass spectrometer as claimed in claim 1, wherein said first scan is commenced at a time $T_1$ start and is completed at a subsequent time $T_1$end and wherein said second scan is commenced at a time $T_2$start and is completed at a subsequent time $T_2$end, and wherein $T_2$end>$T_2$start>$T_1$end>$T_1$start.

12. A mass spectrometer as claimed in claim 1, wherein said control system is further arranged and adapted:

(i) to cause ions to emerge from said first ion trap or ion mobility separator during a third scan, wherein at least some of said ions which emerge from said first ion trap or ion mobility separator are subsequently received by and stored or trapped in or within said second ion trap; and (ii) to cause said second ion trap to eject at least some ions out of said second ion trap during a fourth scan.

13. A mass spectrometer as claimed in claim 1, wherein said step of analysing said ions in the second ion trap comprises analysing said ions with a Fourier Transform analyser, an Ion Cyclotron Resonance mass analyser, an electrostatic mass analyser or an Oribitrap mass analyser.

14. A mass spectrometer as claimed in claim 1, wherein said step of analysing said ions in the second ion trap comprises fragmenting or reacting the ions.

15. A mass spectrometer as claimed in claim 1, further comprising:

(a) one or more ion guides arranged downstream of said first ion trap or ion mobility separator; or (b) one or more ion trapping regions arranged downstream of said first ion trap or ion mobility separator; or (c) one or more collision, fragmentation or reaction cells arranged downstream of said first ion trap or ion mobility separator; or (d) one or more energy analysers or electrostatic energy analysers arranged downstream of said first ion trap or ion mobility separator; or (e) one or more ion detectors arranged downstream of said first ion trap or ion mobility separator.

16. A method of mass spectrometry conducted with a first ion trap or ion mobility separator and a second ion trap comprising a plurality of electrodes, wherein said second ion trap is arranged downstream of said first ion trap or ion mobility separator, said method comprising:

arranging for a group of ions to be within said first ion trap or ion mobility separator at an initial time T0;

causing ions to emerge from said first ion trap or ion mobility separator during a first scan, wherein at least some of said ions which emerge from said first ion trap or ion mobility separator are subsequently received by and stored or trapped in or within said second ion trap; and causing said second ion trap to analyse or eject at least some ions out of said second ion trap during a second scan.

17. A method as claimed in claim 16, further comprising commencing said second scan after said first scan is completed.

18. A method as claimed in claim 16, comprising pulsing ions into said ion mobility separator so that ions are arranged to reside within said ion mobility separator in order to cool to near thermal energies by collisions with buffer gas molecules which are present within said ion mobility separator.

19. A non-transitory computer readable medium containing a computer program executable by a control system of a mass spectrometer comprising a first ion trap or ion mobility separator and a second ion trap arranged downstream of said first ion trap or ion mobility separator, said computer program being arranged to cause said control system:

(i) to arrange for a group of ions to be within said first ion trap or ion mobility separator at an initial time T0;

(ii) to cause ions to emerge from said first ion trap or ion mobility separator during a first scan, wherein at least some of said ions which emerge from said first ion trap or ion mobility separator are subsequently received by and stored or trapped in or within said second ion trap; and (iii) to cause said second ion trap to analyse or eject at least some ions out of said second ion trap during a second scan.

20. A non-transitory computer readable medium as claimed in claim 19, wherein said second scan is commenced after said first scan is completed.

* * * * *